Figure 1:
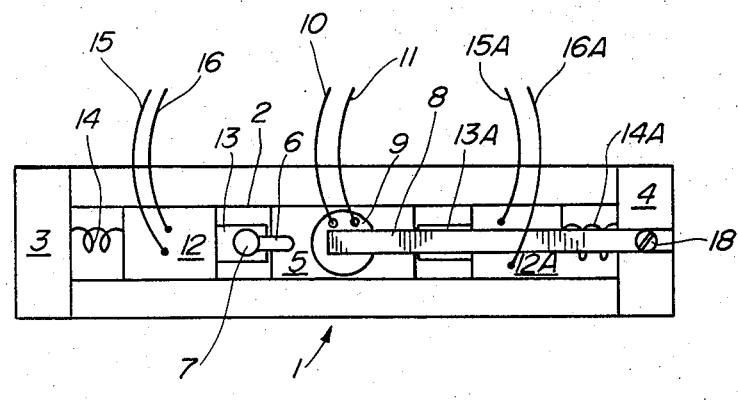

United States Patent [19]
Massa

[11] 3,808,488
[45] Apr. 30, 1974

[54] MEANS FOR MAKING PRECISION MICROADJUSTMENTS IN THE POSITION OF A MOVABLE ELEMENT

[75] Inventor: Frank Massa, Cohasset, Mass.
[73] Assignee: Massa Corporation, Hingham, Mass.
[22] Filed: July 14, 1972
[21] Appl. No.: 272,022

[52] U.S. Cl.............. 310/8.2, 310/8.3, 310/8.7, 310/9.1, 310/8, 310/8.1
[51] Int. Cl............................................. H01v 7/00
[58] Field of Search........... 310/8, 8.1, 8.2, 8.3, 8.7, 310/9.1, 9.4, 26; 318/118; 346/69

[56] References Cited
UNITED STATES PATENTS

| | | | |
|---|---|---|---|
| 3,684,904 | 8/1972 | Galutva et al. | 310/8.1 X |
| 3,608,409 | 9/1971 | Schmidt | 310/8 X |
| 2,506,141 | 5/1950 | Drouin | 318/118 X |
| 3,473,466 | 10/1969 | Thayer | 310/8.1 X |
| 2,275,256 | 3/1942 | Fried | 310/8.7 |
| 3,292,019 | 12/1966 | Hsu et al. | 310/8.1 X |
| 3,526,726 | 9/1970 | Corbett et al. | 310/8 X |

Primary Examiner—J. D. Miller
Assistant Examiner—Mark O. Budd

[57] ABSTRACT

An element or object, such as a magnetic recording head, may be positioned over very small distances with extreme accuracy. This is done by selectively energizing two of three sonic energy transducers. One centrally located transducer vibrates the object to change its static supporting friction to a dynamic friction and, thereby, effectively act as a lubricant. The other two transducers are mounted in linear opposition to drive the head in either of two opposite directions. By simultaneously energizing the central transducer and either of the other two transducers, the head is driven in a selected direction by what amounts to tiny hammer blows.

6 Claims, 2 Drawing Figures

PATENTED APR 30 1974 3,808,488

MEANS FOR MAKING PRECISION MICROADJUSTMENTS IN THE POSITION OF A MOVABLE ELEMENT

This invention relates to means for precisely adjusting the position of a movable mechanical element, and more particularly to means for making a position adjustment with precision in absolute location and with a dimensional tolerance of approximately 10 microns or less.

For the purpose of this invention, the term "microadjustment" means an adjustment in absolute position with an accuracy within the approximate range from one to 10 microns.

An object of this invention is to improve the precision of making microscopic adjustments in the position of a movable mechanical element, with reference to a fixed base to which the element is attached.

Another object of this invention is to adjust the position of a movable mechanical element or object, with reference to a base member to which it is clamped. Here, an object is to provide a movable element on a base which may be moved to a desired location and then clamped in position.

A still further object of this invention is to enable a microadjustment of a movable mechanical element, with reference to a fixed base to which the element is clamped and further to make the microadjustment without having to loosen a clamping mechanism for holding the element.

Still another object of this invention is to provide means for making a precise microadjustment in the position of a movable mechanical element, with reference to a fixed base to which the element is attached. In this connection, an object is to provide an electromechanical transducer for the dual purpose of imparting sonic vibrations to the interface between the two elements for reducing the static friction between them and also for imparting mechanical displacements, in microscopic increments, to the movable element.

While attempting to accurately adjust the position of a movable mechanical element, it is difficult to establish and maintain the absolute location of the element within the order of a few microns, with respect to a fixed reference point. The inherent mechanical limitations and distortions which occur during the positioning and clamping of the movable part to a fixed base precludes the desired degree of precision.

In keeping with an aspect of this invention, means are provided for overcoming these inherent limitations and for providing a procedure for clamping a movable element or object to its supporting base, with a controlled fixed force, such as the force of a spring, for example. The magnitude of the clamping force is sufficiently high, so that the resulting force of friction between the movable part and the fixed base is greater than the maximum inertial forces which will be developed in the movable member to overcome friction under any condition of use, thereby preventing any uncontrolled displacement of the member during operation.

In one embodiment of this invention, the microadjustment procedure employs an electromechanical transducer which is adapted to transmit sonic vibrations into the movable element to temporarily reduce the frictional force between the contact surfaces of the movable part and base member. Simultaneously, an electromechanical transducer imparts controlled microdisplacement blows to the movable piece. When the exact micropositioning of the movable element is achieved, the electromechanical transducers are de-energized. The sonically reduced friction between the movable element and its base is removed. Friction is then restored to its full static magnitude, thereby securely holding the movable element fixed in its exact positioned location.

The use of high frequency sonic energy for reducing the static friction between two surfaces is described in U. S. Pat. No. 2,746,813. The static friction between two bodies is reduced by more than an order of magnitude simply by the application of low level ultrasonic energy into one of the mating surfaces. One embodiment of the present invention makes use of the principle disclosed in the above referenced patent by utilizing sonic energy for reducing the friction between two clamped surfaces.

Figure 2:
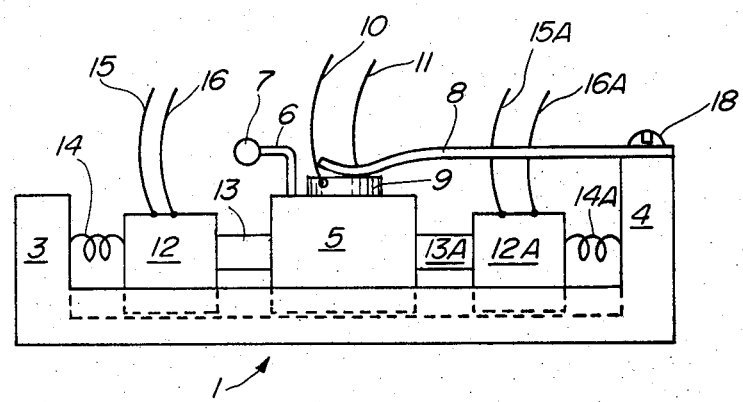

The novel features of the invention will best be understood from the following descriptions of an embodiment thereof, when read in conjunction with the accompanying drawings of which:

FIG. 1 is a plan view of an assembled structure, schematically illustrating the principle of this invention; and FIG. 2 is a side view of the structure illustrated in FIG. 1.

The reference character 1 identifies a rigid frame member which serves as a base for the assembly. Machined into the top surface of the frame member 1 (FIG. 1), is a channel 2 which serves as a slot or guide for holding the elements of the assembly in alignment. The base member 1 includes the vertical end wall portions 3 and 4. A slidable carriage member 5 fits within the channel slot 2 and carries a bracket 6 to which a tip member 7 is attached.

The invention enables the tip 7 to be micropositioned with a dimensional tolerance of less than 10 microns, in absolute location with reference to the fixed base member. The tip 7 is schematically representative of any structural component such as, for example, a video recording or play-back head, which requires microscopic adjustment in its absolute position, with reference to the video tape. Thus, in this example, the invention provides an exact mechanical alignment, synchronized with closely spaced recording tracks.

If the slidable carriage member 5 were secured to the frame 1 by means of mechanical clamps or bolts and if a conventional set-screw means of adjustment were provided for moving the member 5, it would be impossible to make the required highly precise microadjustment in position. The inherent degree of flexibility or yield in the materials which made up the conventional clamping structure introduces a kind of mechanical "back-lash" which would make impossible the desired degree of microscopic control in positioning.

To avoid the use of rigid clamps and set-screws and to achieve the objects of this invention, the carriage member 5 is held firmly in place by a vertical force applied through a cantilever spring member 8. The magnitude of the force applied through the spring is sufficiently high so that the static friction between the carriage member 5 and the surface of the frame 1 is greater than the maximum inertial forces which is developed in the movable member 5 to overcome friction, under all conditions of use of the assembled structure.

Between the spring member 8 and the carriage structure 5 is an electromechanical transducer 9. Electrical conductors 10 and 11 enable the application of an electrical signal for operating the transducer. The spring 8 serves the dual purpose of applying a mechanical clamping force to the structure 5 and also of maintaining an intimate contact between the vibratile surface of the transducer 9 and the adjacent surface of the member 5. A machine screw 18 secures the spring 8 to the frame portion 4.

The transducer 9 may be any well known generally available type. For example, the transducer might be of a circular disc of polarized ceramic which can vibrate in the thickness mode if a-c electrical power is applied to the conductor terminals 10 and 11. The ceramic disc may be encased in a thin protective housing. It may also be coated with an insulating waterproof covering; or, it may be assembled in any other configuration, as is well known in the art.

Two electromechanical transducers 12, 12A are mounted in linear opposition. In greater detail, an electromechanical transducer 12, which includes a vibratile tip portion 13, is slidably located in the channel slot 2. A light spring 4 urges transducer 12 toward block 5 and serves to keep the vibrating tip 13 in light contact with the end face of the member 5. Electrical conductors 15 and 16 provide means for applying a-c electrical power to operate the transducer. The transducer 12 may be of any well known type, such as, for example, a ceramic disc attached to an inertial mass on one of its faces and to a driving rod attached to the opposite disc face.

Another transducer 12A, identical to the transducer 12, may be positioned in linear opposition on the other side of the block 5. It has a vibratile tip 13A, making contact with the opposite side or face of carriage member 5. A light spring 14A serves the same function as the spring 14 for urging the transducer 12A toward member 5. Electrical conductors 15A and 16A serve as electrical terminals for supplying a-c power to operate the transducer 12A.

Either of the transducers 12 or 12A may be driven at any desired frequency, either in the audible or ultrasonic range, whereby corresponding vibrations occur at the vibratile tips 13 or 13A.

The above described assembly enables a micropositioning of the carriage member 5 to a selected location, with very close tolerances, which may be in the region of about 1 micron or even less under ideal conditions.

The operation of the micropositioning system just described will now be described. When the transducer 9 is activated by supplying a-c power to its terminal conductors 10 and 11, sonic vibrations are vertically transmitted (as viewed in FIG. 2) through the carriage member 5. These vibrations reduce the coefficient of friction between the contact surfaces of the carriage 5 and the base member 1, and thereby acts somewhat as a lubricant. Responsive to an application of a-c power to its terminals 15 and 16, transducer 12 is activated and the vibratile tip 13 is set into vibration. The spring member 14 keeps the face of the vibratile tip 13 in light contact with the end of the carriage member 5. Because of the inertia of the transducer 12, the vibratile tip 13 imparts many tiny hammer blows upon the carriage 5, thereby causing microscopic incremental displacements of the carriage member 5, as it slides in a direction away from the vibrating tip 13.

If the transducers 9 and 12A are activated simultaneously, the microdisplacements of the carriage member 5 take place in the opposite direction. Therefore, by simultaneously supplying a-c power to transducer 9 and to either of the transducer 12 or 12A, the exact position of the carriage member 5 may be controlled very accurately. When the exact location of member 5 is established, all transducers are deactivated. The normal static friction is restored between the contact surfaces of the carriage member 5 and the base member 1, thereby securing the carriage member 5 in its precise location.

The operation of the micropositioning system, as described, includes the use of the transducer 9 to temporarily reduce the coefficient of friction between the surfaces of the carriage member 5 and the base member 1. However, the teachings of this invention can also be carried out without the use of the transducer 9, and by allowing the spring 8 to press directly on the top surface of the carriage member 5. In this simplified design, the absence of the transducer 9 means that higher friction forces must be overcome by the action of transducer 12 or 12A. Therefore, the time required to achieve a total displacement of the carriage member 5 is somewhat greater than it is when the transducer 9 is utilized.

Without the use of the transducer 9, the coefficient of friction between the carriage member 5 and the base member 1 is reduced somewhat, because of the vibrations transmitted into the body of the carriage member due to the vibrations imparted by the transducer tip 13 or 13A. Therefore, in many applications, where only tiny displacements are required for micropositioning of relatively small carriage members, the slight increase in time for completing the adjustment is of no practical consequence. Therefore, the more economical assembly which eliminates the transducer 9 is equally satisfactory. On the other hand, in some applications, involving large carriage members, it is more advantageous to include the use of the transducer 9 in the system.

If the mechanism which requires the micropositioning of the carriage member 5 is constructed in a manner such that the positioning may be achieved by moving the carriage in only one direction, then one of the transducers 12 or 12A may also be eliminated. The invention is thus reduced to a simple form, whereby only one of the micropositioning transducers such as 12 remains in the complete system and all the other transducers are eliminated.

While several specific illustrative embodiments of the present invention have been described, it should, of course, be understood that various modifications and alternative constructions may be made without departing from the true spirit and scope of the invention. Therefore, the appended claims are intended to cover all equivalent structures which fall within their true spirit and scope.

I claim:

1. In a micropositioning system including a base member having a movable element mounted thereon, spring clamping means for holding said element in frictional contact with said base member with a predetermined force between said base and element, means including at least one electromechanical transducer comprising a body portion and a vibratile tip portion for microadjusting the position of said element on said base member, means for supporting said transducer with said vibratile tip portion making physical contact with said movable element, and a second electromechanical transducer means associated with said element for supplying sonic vibrational energy to said element to reduce the coefficient of friction between said element and said base member.

2. The invention in claim 1 wherein said second electromechanical transducer means is held in contact with said element by said spring which clamps said carriage member to said base member.

3. A positioning structure including a base support member and a movable carriage member slidably mounted on said base member, means for microadjusting the position of said carriage member with reference to said base member, said microadjustment means including two electromechanical transducer means slidably mounted in linear opposition on said base member, each of said transducer means comprising a body portion and a vibratile tip portion oriented with said vibratile tip portions making contact with opposed surface portions of said movable carriage member, and means for clamping said carriage member to said base member with a predetermined force which may be overcome by the vibrations of said transducer means.

4. The invention in claim 3 wherein said means for clamping said carriage member includes a spring for applying a fixed force between said carriage member and said base member.

5. The invention in claim 4 wherein said predetermined force is a friction force, and third electromechanical transducer means associated with said carriage member for supplying sonic vibrational energy to said carriage member for reducing the coefficient of friction between said carriage member and said base member.

6. The invention in claim 5 wherein said third electromechanical transducer means is held in contact with said carriage member by said spring means.

* * * * *